(12) United States Patent
Gomi

(10) Patent No.: US 8,134,769 B2
(45) Date of Patent: Mar. 13, 2012

(54) IMAGING APPARATUS

(75) Inventor: Yuichi Gomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 477 days.

(21) Appl. No.: 12/472,743

(22) Filed: May 27, 2009

(65) Prior Publication Data

US 2009/0295967 A1 Dec. 3, 2009

(30) Foreign Application Priority Data

May 27, 2008 (JP) .................... 2008-138164

(51) Int. Cl.
*H04N 5/217* (2011.01)
*H04N 3/14* (2006.01)
*H04N 5/335* (2011.01)

(52) U.S. Cl. ........................ 359/241; 348/308

(58) Field of Classification Search .................. 348/241, 348/297, 308–310; 250/208.1
See application file for complete search history.

(56) References Cited

U.S. PATENT DOCUMENTS

2008/0049129 A1* 2/2008 Meacham ..................... 348/297

FOREIGN PATENT DOCUMENTS

JP 2000-287131 A 10/2000
JP 2007-20156 A 1/2007

* cited by examiner

*Primary Examiner* — Alicia M Harrington
(74) *Attorney, Agent, or Firm* — Westerman, Hattori, Daniels & Adrian, LLP

(57) ABSTRACT

A plurality of pixels arranged into two dimensions; a differential processing means for effecting a differential processing between a reset level of the pixel and a signal level changing correspondingly to a light signal incident on the pixel so as to produce an imaging signal of the pixel; a reset level detection means for detecting and outputting a result as to whether the reset level is within a predetermined range or outside the predetermined range; an extraction means for extracting pixels to be corrected based on a result of the differential processing by the differential processing means and the result of detection by the reset level detection means; and a correction means for replacing the result of the differential processing by the differential processing means of the pixels to be corrected extracted by the extraction means with an imaging signal corresponding to a saturation level.

2 Claims, 10 Drawing Sheets

IMAGING APPARATUS

This application claims benefit of Japanese Patent Application No. 2008-138164 filed in Japan on May 27, 2008, the contents of which are incorporated by this reference.

BACKGROUND OF THE INVENTION

The present invention relates to imaging apparatus such as a digital camera, digital video camera, etc. using a solid-state imaging device.

In recent years, MOS solid-state imaging devices capable of forming peripheral circuits on chip have been remarkably improved in their performance and are being spread. With a MOS solid-state imaging device, a plurality of transistors such as an amplification transistor and a reset transistor in addition to a photoelectric conversion device are provided in each one pixel. Variances in threshold of the transistors among pixels and kTC noise (thermal noise) at the time of their resetting are the cause of a fixed pattern noise and/or random noise in image. To remove these noises, a differential processing is effected between a reset level immediately after the resetting and a signal level. In those solid-state imaging devices where such a differential processing is effected, a problem referred to as black-sun phenomenon occurs.

FIG. 1A shows a dependency of reset level and signal level on light amount. The vertical axis indicating signal level in this case is shown so that "+" direction indicates the direction of change by incidence of light. As shown in FIG. 1A, a signal Vs outputted from the amplification transistor to which signal after photoelectric conversion by photoelectric conversion device is inputted contains a signal generated by the photoelectric conversion and a reset signal Vr. From the solid-state imaging device, therefore, a difference signal (Vs−Vr) is outputted as signal generated by the photoelectric conversion by subtracting the reset signal Vr from the signal Vs (differential processing).

FIG. 1B shows a dependency on light amount of the difference signal (Vs−Vr). Since the signal Vs is saturated (level of Vssat in FIG. 1A) when the incident light amount is more intense than point B, the difference signal (Vs−Vr) is also saturated to attain a certain value (level of Vsat in FIG. 1B). Although the reset signal Vr maintains a certain level (level of Vr1 in FIG. 1A) even when the signal Vs is saturated, the level of the reset signal Vr is changed as shown in FIG. 1A when an even stronger light that is more intense than point C is incident. For this reason, the difference signal (Vs−Vr) becomes smaller as shown in FIG. 1B to result in the black-sun phenomenon.

The above described level change of the reset signal Vr occurs due to the fact that, because of light leak, a light leak noise signal is added to the reset signal at an input section of the amplification transistor when an extremely intense light is incident on the photoelectric conversion section. This is the condition of regions where the incident light amount is more intense than point C, and the difference signal (Vs−Vr), i.e. the result of the differential processing is reduced. When the reset signal Vr reaches its saturation (point E) due to the light leak noise signal, the difference signal (Vs−Vr) becomes 0 and the black-sun phenomenon occurs.

If such black-sun phenomenon occurs, for example in the case of photographing the sun, an unnatural image results as a center portion of the sun becomes a black spot as shown in FIG. 2A. Shown in FIG. 2B is a conceptual drawing where the sun and its periphery within the dotted line frame in FIG. 2A are shown in correspondence to the light amounts in FIG. 1B. A to E in FIG. 2B represent the light amount levels A to E in FIG. 1B. In this manner, since the light amount in periphery of an intense incident light is generally gradually reduced, it as an image results in something like the pattern of a donut where the levels change about the region on which the intense light is incident.

As a method to suppress such black-sun phenomenon, Japanese Patent Application Laid-Open 2000-287131 discloses one in which a change in the output of reset level is detected and, when it is determined as an occurrence of the black-sun phenomenon, a predetermined value is written as the reset level output. Further, Japanese Patent Application Laid-Open 2007-20156 discloses another in which a clamp circuit is provided on a signal line to which pixel outputs are commonly connected so as not to allow a change exceeding a predetermined level in the output of the reset level.

Basically in both of the prior-art techniques disclosed in the above publications, a change in the reset level output is detected and, when it is determined as an occurrence of black-sun phenomenon, the reset level or the signal level or the result of differential processing (difference signal) is set to a predetermined value so as to correct a final output of the pixel where the black-sun phenomenon occurs. In detecting the change in reset level output, since there are variances in pixel and the circuit for detecting output change, a detection level must be set with a margin. Accordingly, there has been a problem that a dynamic range of the final output is reduced corresponding to such margin.

The manner of occurrence of this problem will be described below by way of FIGS. 1A and 1C. It is supposed in FIG. 1A that a level indicated by Vref is the detection level for detecting a change in the output of reset level. This detection level Vref is set with a certain margin considering the above described variances. In the case of the illustrated example, an occurrence of black-sun phenomenon is determined when the light amount exceeds the point of D, and it is corrected for example so that the result of differential processing (difference signal) attains a level that securely exceeds that of saturation. The dependency on light amount of the differential processing result (Vs−Vr) thereby attains a characteristic as shown in FIG. 1C so that an occurrence of the black-sun phenomenon is unavoidable in the portion where the light amount is from point C to point D. For this reason, the differential processing result (Vs−Vr) is clipped at a level indicated by Vb in FIG. 1C through a processing circuit at a later stage. Accordingly, the dynamic range is reduced in relation to Vsat that is a theoretical saturation level.

SUMMARY OF THE INVENTION

In a first aspect of the invention, there is provided an imaging apparatus including: a plurality of pixels arranged into two dimensions; a differential processing means for effecting a differential processing between a reset level of the pixel and a signal level changing correspondingly to a light signal incident on the pixel so as to produce an imaging signal of the pixel; a reset level detection means for detecting and outputting a result as to whether the reset level is within a predetermined range or outside the predetermined range; an extraction means for extracting pixels to be corrected based on a result of the differential processing by the differential processing means and the result of detection by the reset level detection means; and a correction means for replacing the result of the differential processing by the differential processing means of the pixels to be corrected extracted by the extraction means with an imaging signal corresponding to a saturation level.

In a second aspect of the invention, the extraction means in the imaging apparatus according to the first aspect extracts as the pixels to be corrected those pixels located between pixels of which the result of detection by the reset level detection means is outside the predetermined range and pixels of which the result of the differential processing by the differential processing means is at the saturation level.

DESCRIPTION OF THE PREFERRED EMBODIMENTS

An embodiment of the imaging apparatus according to the invention will be described below with reference to the drawings.

Figure 3:
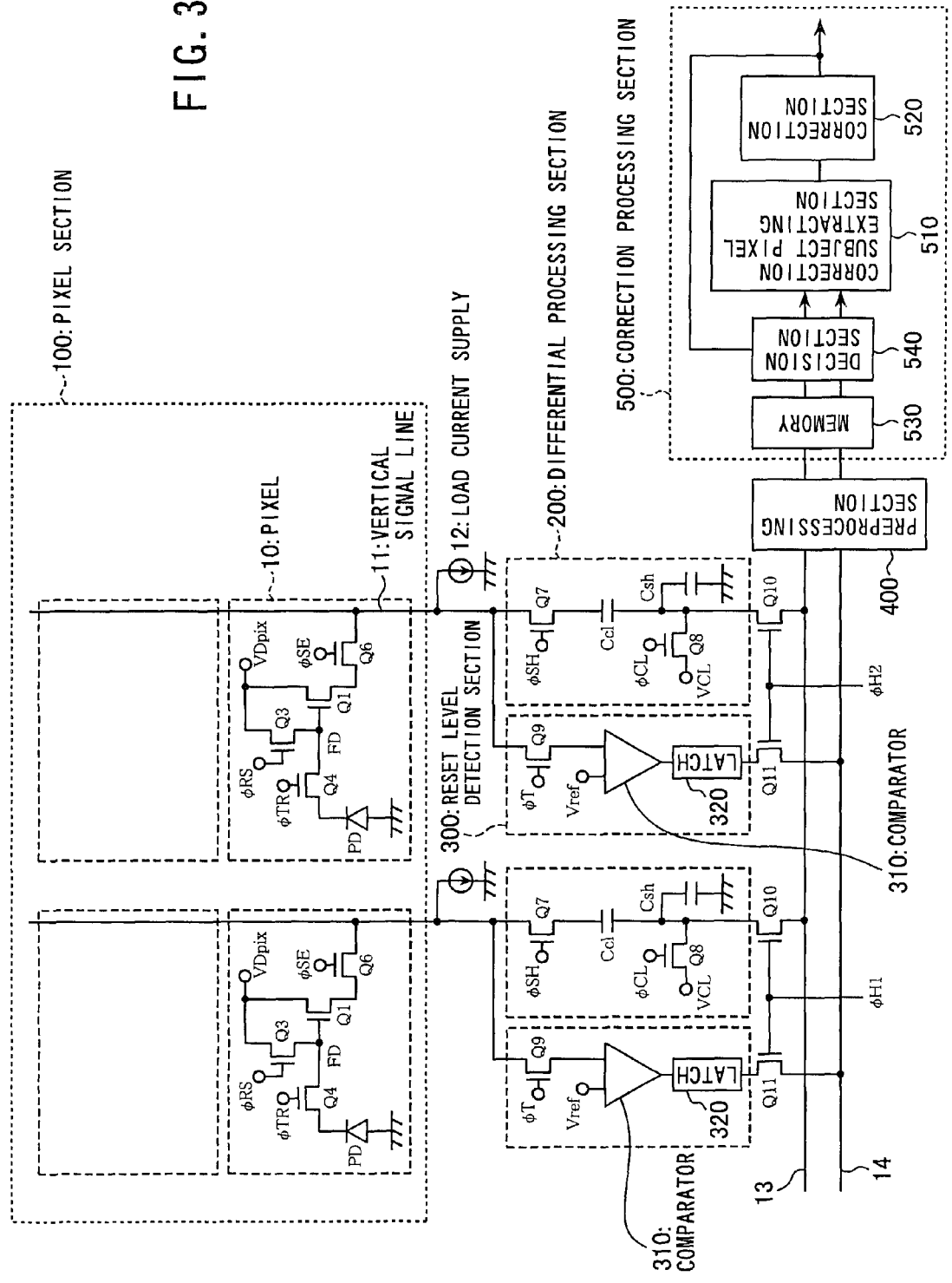
FIG. 3 is circuit diagram showing partially in blocks the construction of an embodiment of the imaging apparatus according to the invention.

The construction of an embodiment of the imaging apparatus according to the invention will now be described by way of FIG. 3. Referring to FIG. 3, a numeral 10 denotes a unit pixel a plurality of which are two-dimensionally arranged into a matrix to acquire image information. In the unit pixel 10, PD is a photodiode for effecting photoelectric conversion and Q1 is an amplification transistor for amplifying and outputting pixel signal by effecting charge/voltage conversion of photo-generated electric charges occurring at the photodiode PD for example by means of a pn junction capacitor or gate capacitor. The gate terminal of the amplification transistor Q1 serves as an input section. The input section of the amplification transistor Q1 will hereinafter be referred to as FD section. Q4 indicates a transfer transistor for transferring the photo-generated electric charges occurring at the photodiode PD to the FD section, Q3 a reset transistor for resetting the FD section, and Q6 a select transistor for transmitting pixel signal or the output of the amplification transistor Q1 to a vertical signal line 11. Here, all components but the photodiode PD in the unit pixel 10 are shielded from light.

VDpix is a pixel power supply which is to supply power to all the pixels in common and is electrically connected to a drain terminal of the amplification transistor Q1 and to a drain terminal of the reset transistor Q3. A reset pulse φ RS for controlling reset operation is to be applied on a gate terminal of the reset transistor Q3. The reset pulse φ RS is supplied row by row from a vertical select circuit (not shown). A transfer pulse φ TR for controlling transfer operation is to be applied on a gate terminal of the transfer transistor Q4. The transfer pulse φ TR is also supplied row by row from the vertical select circuit (not shown). A select pulse φ SE for controlling select operation is to be applied on a gate terminal of the select transistor Q6. The select pulse φ SE is also supplied row by row from the vertical select circuit (not shown). With such pixel construction, a photoelectric conversion function, a reset function, an amplification/read function, and select function are achieved.

A numeral 100 denotes a pixel section where unit pixels 10 are two-dimensionally arranged into a matrix. For ease of explanation in this case, it is shown as the pixels 10 arranged into 2 rows by 2 columns. A numeral 12 denotes a load current supply connected to the vertical signal line 11 of each column of the pixel section 100. A source follower circuit is formed of the load current supply 12 and the amplification transistor Q1. The load current supply 12 in this case serves to flow a constant bias current.

A numeral 200 denotes a differential processing section. At the differential processing section 200, a differential processing is effected column by column between a reset level immediately after resetting the FD section and a light signal level immediately after transferring photo-generated electric charges to the FD section in the pixel signal outputted from the above described source follower circuit, and a result of the differential processing being stored after for example removing an offset variance such as a fixed pattern noise of pixel. A case is shown here of constituting the differential processing section 200 by a clamp-type circuit, and it includes: a clamp capacitor Cc1 for clamping signal of reset level; a sample-and-hold capacitor Csh for retaining a difference signal corresponding to the differential processing result between the reset level and the light signal level; a sample-and-hold transistor Q7; and a clamp transistor Q8 for connecting one end of the clamp capacitor Cc1 and the sample-and-hold capacitor Csh to a clamp voltage VCL. A sample-and-hold pulse φ SH and a clamp pulse φ CL for respectively controlling the sample-and-hold transistor Q7 and the clamp transistor Q8 are supplied from a control circuit (not shown).

A numeral 300 denotes a reset level detecting section. At the reset level detecting section 300, a detection is effected column by column as to whether or not a change in output of the reset level immediately after resetting the FD section in the pixel signal outputted from the above described source follower circuit has been exceeded a predetermined threshold, and a result of the detection is stored. The reset level detecting section 300 in this case includes: a reset level transmitting transistor Q9 for transmitting pixel signal in an output period of the reset level; a comparator 310 taking Vref as the threshold value of output change in the reset level (hereinafter referred to as "reset level threshold Vref") to compare the reset level with the reset level threshold Vref; and a latch 320 for retaining a result of such comparison. A reset level transmission pulse φ T for controlling the reset level transmitting transistor Q9 is supplied from a control circuit (not shown).

Q10, Q11 denote horizontal select switches for respectively transmitting to horizontal signal lines 13, 14 the differential processing result stored at the differential processing section 200 and the reset level detection result stored at the reset level detecting section 300 in accordance with horizontal scanning pulses φ H1, φ H2 outputted from a horizontal select circuit (not shown).

A numeral 400 denotes a preprocessing section for providing an output to a correction processing section 500 at a subsequent stage after effecting such processing as amplification and AD conversion as required on the differential processing result stored at the differential processing section 200 and the reset level detection result stored at the reset level detecting section 300 that are transmitted to the horizontal signal lines 13, 14. A numeral 500 denotes the correction processing section. The correction processing section 500 includes: a memory 530 for storing the differential processing result and the reset level detection result; a decision section 540 for deciding based on the reset level detection result whether or not a correction processing is to be effected; a correction subject pixel extracting section 510 for extracting pixel to be corrected from the differential processing result and the reset level detection result; and a correction section 520 for correcting the differential processing result of the pixel to be corrected extracted at the correction subject pixel extracting section 510.

Figure 4:
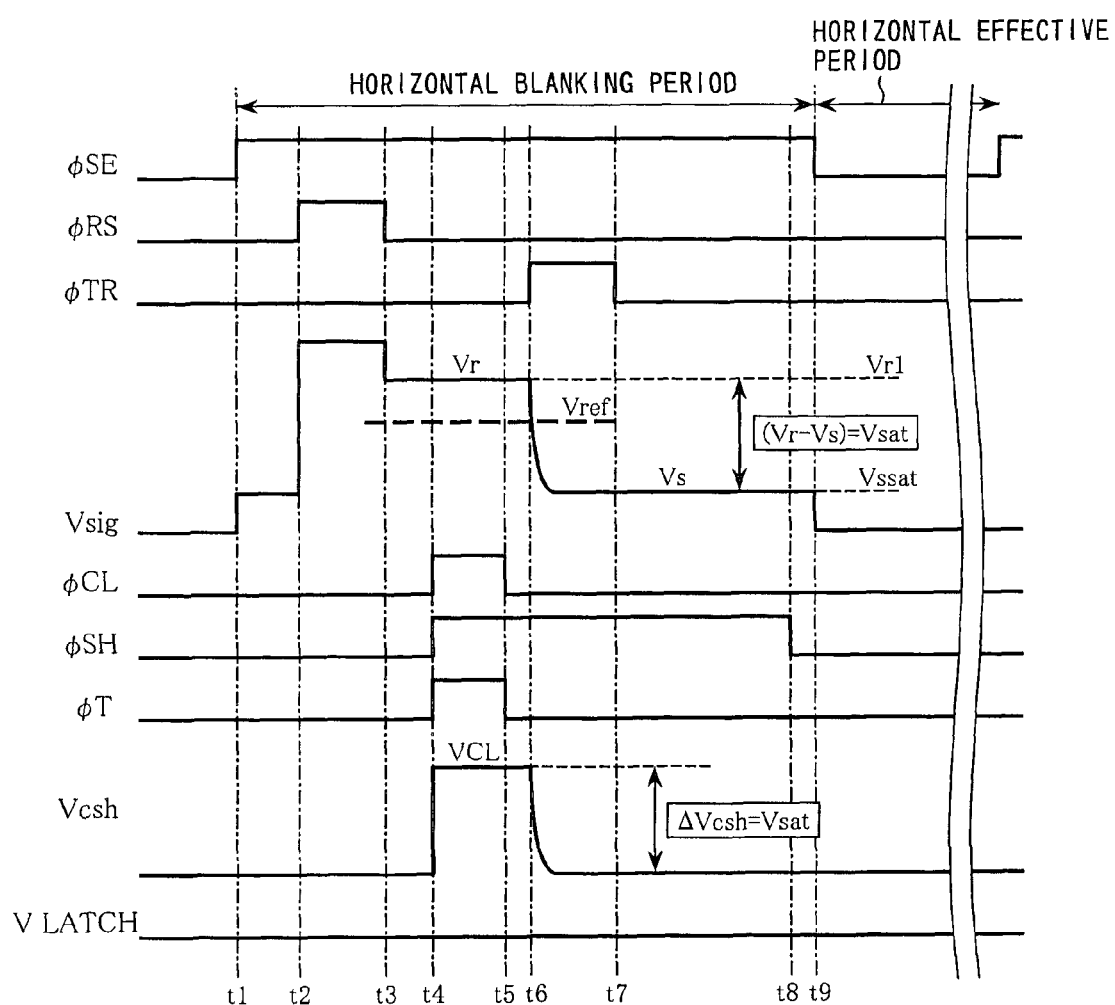
FIG. 4 is a timing chart for explaining an operation in the case where a light amount with which the black-sun phenomenon does not occur but light signal is saturated is incident in the embodiment shown in FIG. 3.

A read operation of pixel signal in the imaging apparatus shown in FIG. 3 will now be described by way of a timing chart in FIG. 4. Referring to FIG. 4, Vsig indicates a pixel signal waveform (pixel output) outputted onto the vertical signal line 11, and Vref as indicated by a dashed line represents a reset level threshold in the reset level detecting section 300. Also referring to FIG. 4, Vcsh indicates a signal waveform of the sample-and-hold capacitor Csh in the differential processing section 200, and V latch indicates a signal waveform of the latch 320 in the reset level detecting section 300. Further, the timing chart shown in FIG. 4 illustrates a case where the black sun phenomenon does not occur but a light amount that makes light signal saturated is incident on pixel, corresponding to the range of light amount B to light amount C in FIGS. 1A to 1C.

When a row select pulse φ SE is driven to "H" level at time t1 in a horizontal blanking period, the row select transistor Q6 is turned ON so that a pixel signal amplifying level of the FD section within pixel 10 is outputted onto the vertical signal line 11. Next, the reset pulse φ RS is driven to "H" level at time t2 to turn ON the reset transistor Q3 so as to make the FD section conductive to the pixel power supply VDpix. Subsequently at time t3, when the reset pulse φ RS is brought to "L" level to turn OFF the reset transistor Q3, the FD section attains a floating state. The level of this state is a reset level which is indicated by Vr in the pixel output Vsig.

Figure 1A:
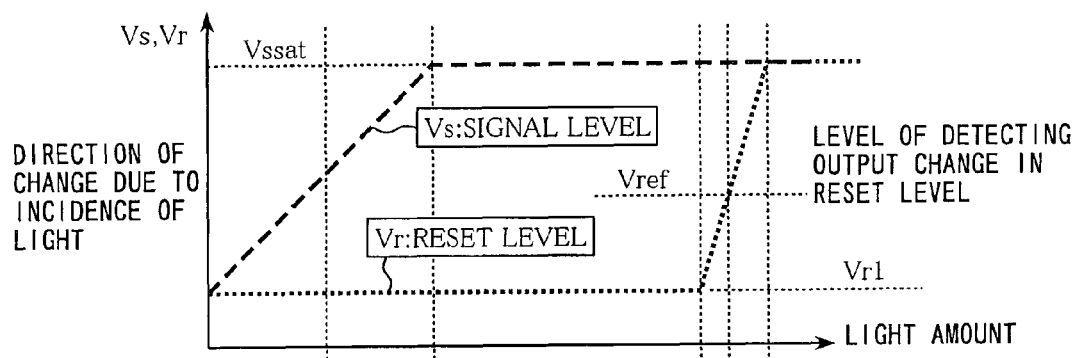
FIGS. 1A to 1C show a dependency on light amount of reset level and signal level, a dependency on light amount of differential processing result, and a dependency on light amount of clipped differential processing result regarding the light amount in a solid-state imaging device where a prior-art differential processing is performed.

In the timing chart shown in FIG. 4, since the manner without an occurrence of the black-sun phenomenon is shown, the reset level Vr is at the level of Vr1 as indicated in FIG. 1A. After that, the transfer pulse φ TR is driven to "H" level at time t6 to turn ON the transfer transistor Q4 so as to transfer photo-generated electric charges accumulated at the photodiode PD to the FD section. Subsequently at time t7, the transfer operation is ended when the transfer pulse φ TR is brought to "L" level to turn OFF the transfer transistor Q4 so that the FD section changes in signal level corresponding to the photo-generated electric charge amount. This condition is a light signal level which is indicated by Vs in the pixel output Vsig.

Figure 1B:
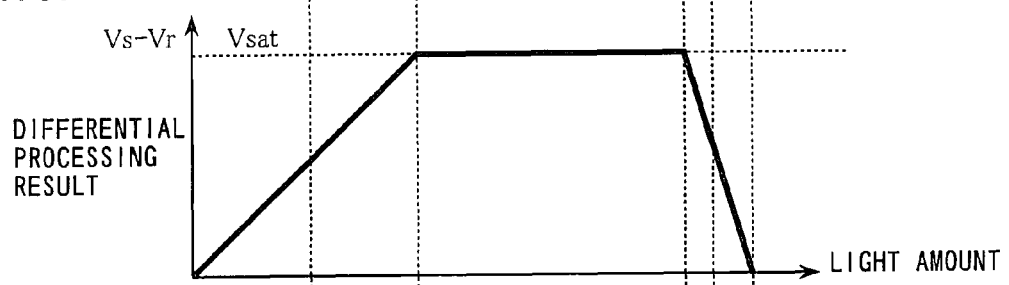

Since the timing chart in FIG. 4 shows the manner of incidence of a light amount with which pixel signal is saturated, the light signal level Vs is the level of saturated Vssat of light signal as indicated in FIG. 1A. Subsequently at time t9, the select transistor Q6 is turned OFF by bringing the select pulse φ SE to "L" level so as to disconnect between the pixel 10 and the vertical signal line 11. It is seen as has been described above that the differential output between the reset level Vr and the light signal level Vs becomes a signal proportional to the photo-generated electric charges. In FIG. 4, the difference signal (Vr−Vs) attains the saturated output Vsat of a difference signal as indicated in FIG. 1B.

At the differential processing section 200, on the other hand, the clamp pulse φ CL and the sample-and-hold pulse φ SH are driven to "H" level at time t4 so as to turn ON the sample-and-hold transistor Q7 and the clamp transistor Q8. One terminal of the clamp capacitor Cc1 and a terminal of the sample-and-hold capacitor Csh are thereby fixed to the clamp voltage VCL, and at the same time the reset level of pixel signal is clamped to the clamp capacitor Cc1. Subsequently at time t5, after bringing the clamp pulse φ CL to "L" level to OFF the clamp transistor Q8, the sample-and-hold pulse φ SH is brought to "L" level to OFF the sample-and-hold transistor Q7. Retained thereby at the sample-and-hold capacitor Csh is an output (Δ Vcsh) obtained by multiplying a gain at the differential processing circuit 200 on the difference (Vsat in this case: saturated output) between the reset level Vr and the light signal level Vs. The output Δ Vcsh is a result of the differential processing. It should be noted that the gain at the differential processing circuit 200 in this case is shown as 1 for ease of explanation so that the differential processing result Δ Vcsh is equal to the saturated output Vsat of difference signal.

At the reset level detecting section 300, the reset level transmission pulse φ T attains "H" level in a period from time 4 to time 5. Whether the reset level is within a threshold or outside the threshold is thereby detected at the comparator 310, and an output of the comparator 310 is stored to the latch 320 at the falling of the transmission pulse φ T. Specifically in this case, it is supposed that the comparator 310 is to output "L" level to indicate that it is within the threshold when the reset level Vr is equal to or above the reset level threshold value Vref, and output "H" level to indicate that it is outside the threshold when the reset level Vr is lower than the reset level threshold value Vref. In the case shown in the timing chart of FIG. 4, since the reset level Vr is detected as within the threshold, the comparator 310 outputs "L" level in the period from time t4 to time t5, and the latch 320 retains "L" level.

Subsequently in a horizontal effective period, the horizontal scanning pulses φ H1, φ H2 are sequentially driven to "H" level to ON the column select transistors Q10, Q11. The differential output result retained at the sample-and-hold capacitor Csh is thereby transmitted onto the horizontal signal line 13, and the reset level detection result retained at the latch 320 onto the horizontal signal line 14, respectively. The differential output result and the reset level detection result are then inputted to the preprocessing section 400 to be amplified and AD-converted so as to be readily subjected to signal processing at the correction processing section 500 and are inputted to the correction processing section 500. By repeating this operation row by row, the differential output results and the reset level detection results corresponding to one frame are retained at the correction processing section 500. The operation within the correction processing section 500 will be described later.

Figure 1C:
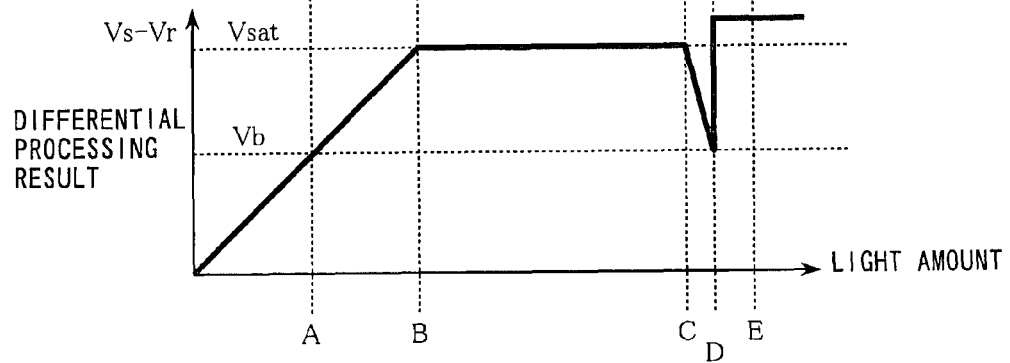
Figure 2A:
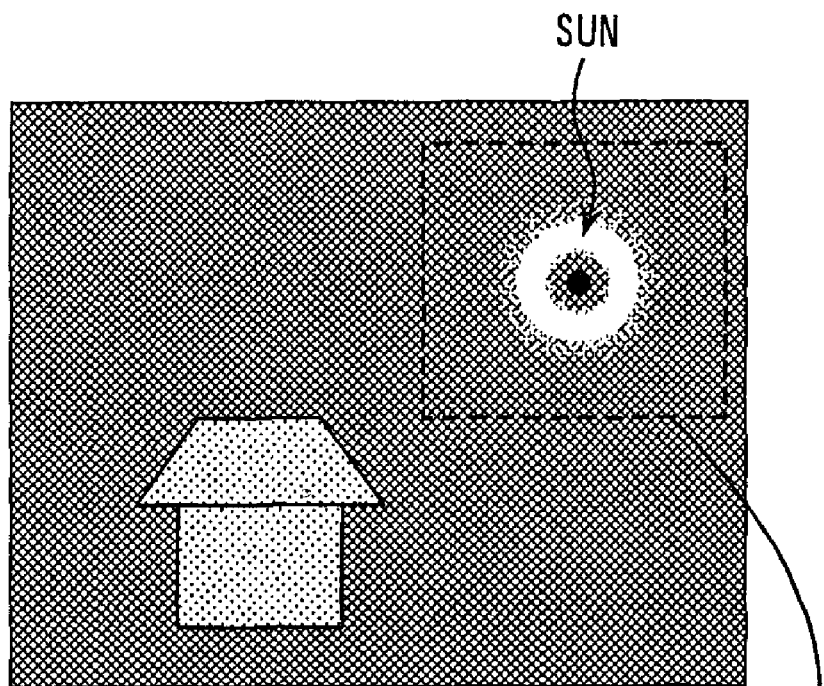
FIGS. 2A and 2B show an image in the case where the black-sun phenomenon occurs as the sun is photographed.
Figure 2B:
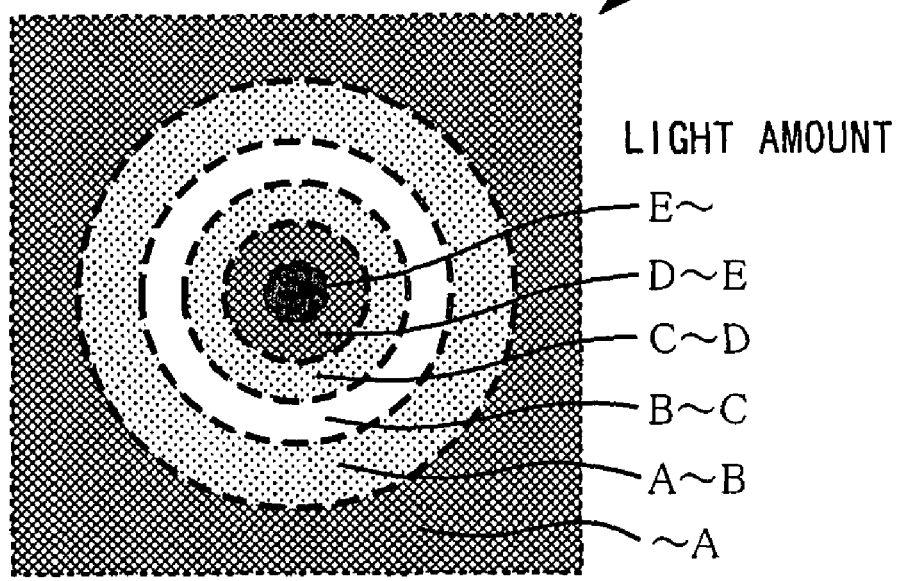
Figure 5:
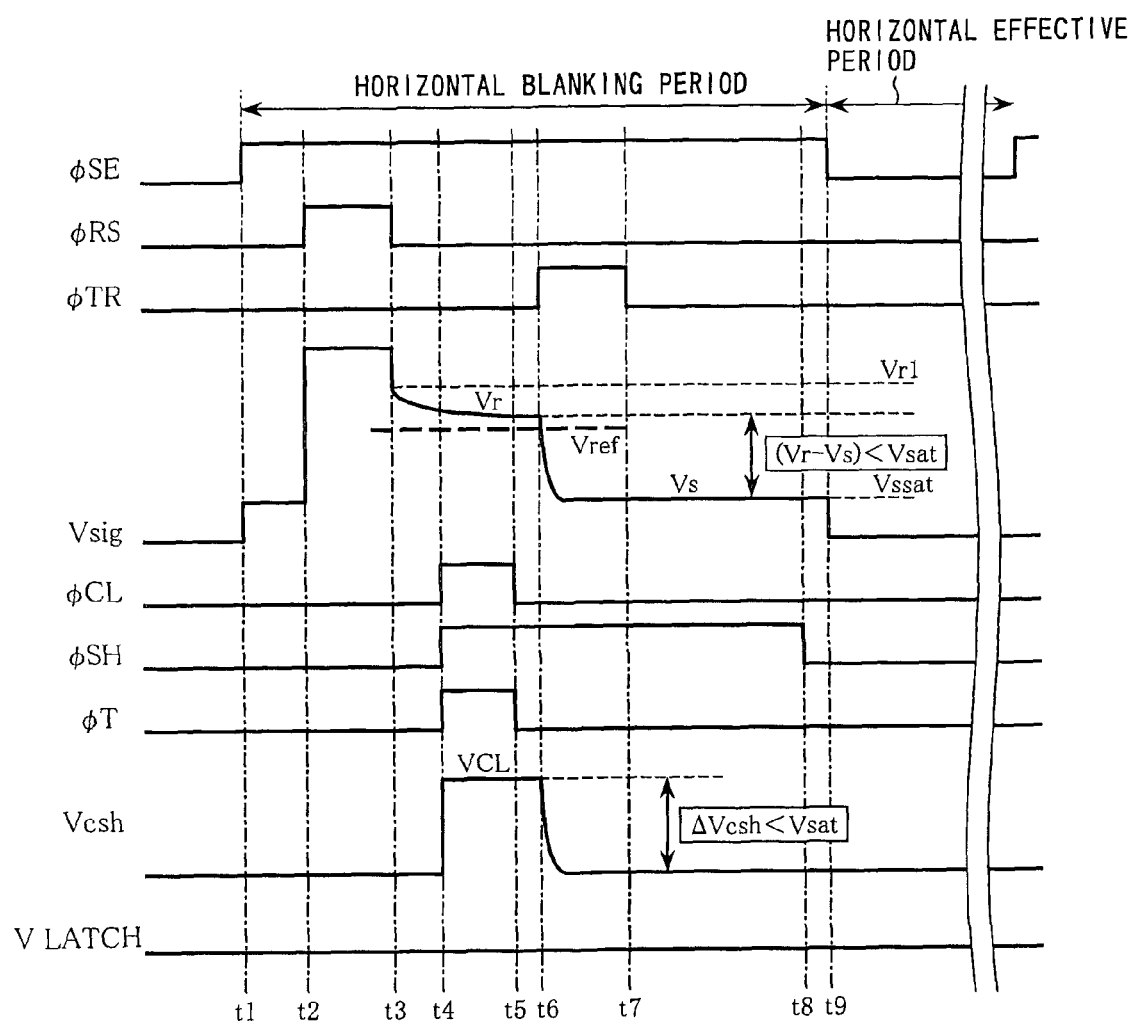
FIG. 5 is a timing chart for explaining an operation in the case where a light amount from C to D in FIGS. 1A to 1C is incident in the embodiment shown in FIG. 3.
Figure 6:
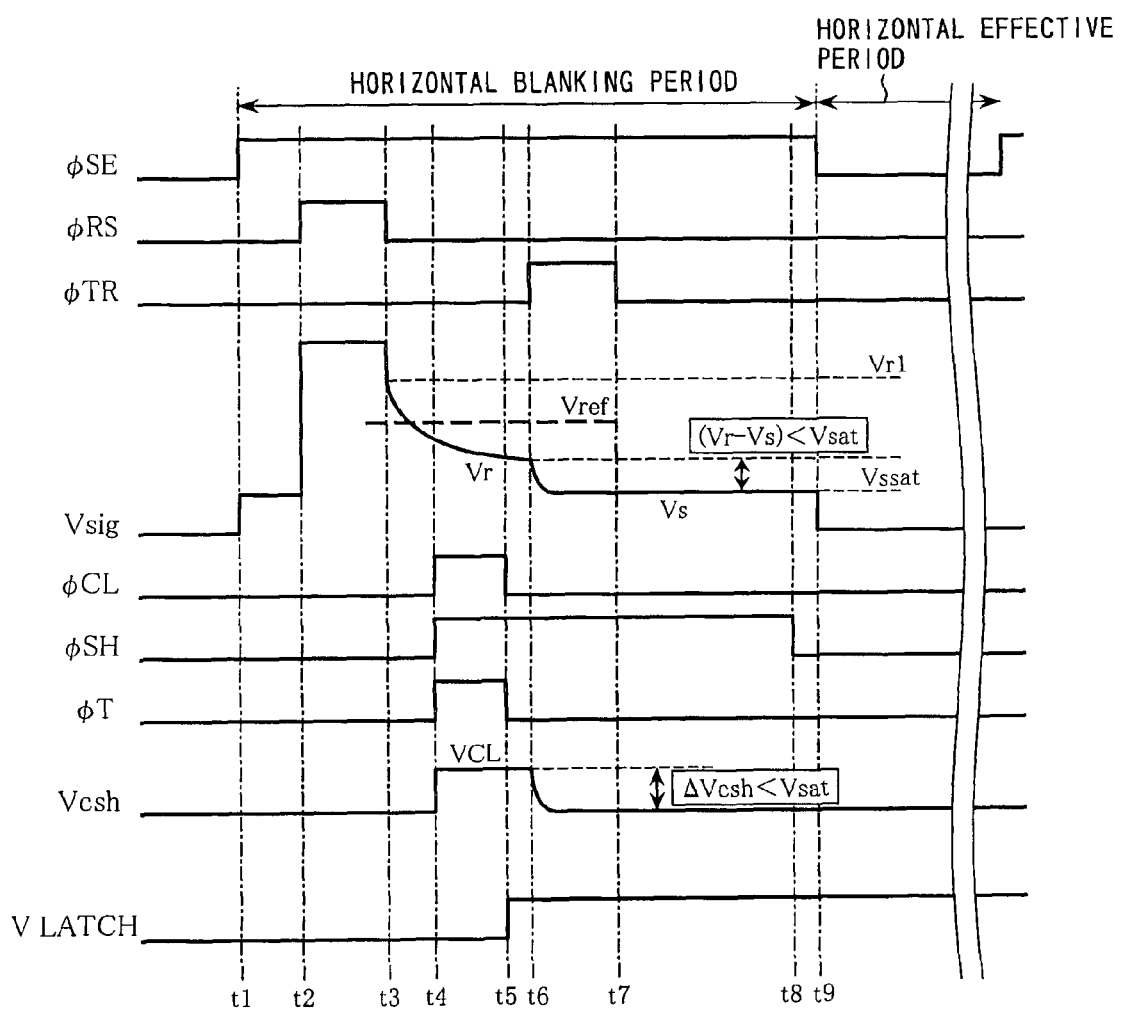
FIG. 6 is a timing chart for explaining an operation in the case where a light amount from D to E in FIGS. 1A to 1C is incident in the embodiment shown in FIG. 3.
Figure 7:
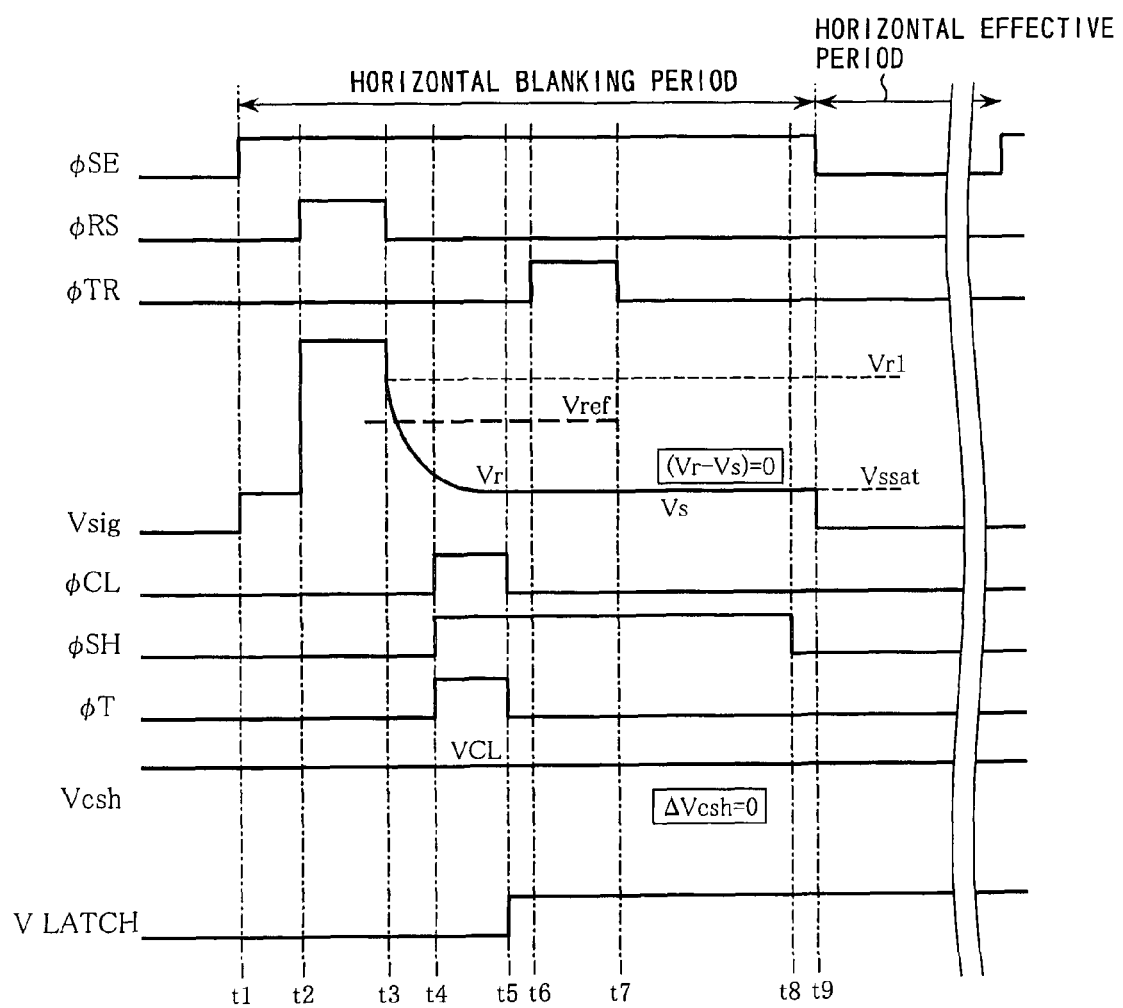
FIG. 7 is a timing chart for explaining an operation in the case where a light amount of E or above in FIGS. 1A to 1C is incident in the embodiment shown in FIG. 3.

A description will now be given with respect to cases where a light amount that causes the black-sun phenomenon is incident on pixel. A timing chart in FIG. 5 shows an operation in the case where a light amount corresponding to the range of light amount C to light amount D in FIGS. 1A to 1C is incident; a timing chart in FIG. 6 shows an operation in the case where a light amount corresponding to the range of light amount D to light amount E is incident; and a timing chart in FIG. 7 shows an operation in the case where a light amount corresponding to light amount E or above is incident. The respective timing charts of FIG. 4, FIG. 5, FIG. 6, and FIG. 7 are different from each other in the output waveform of the pixel output Vsig, and therefore are also different in the signal waveform Vcsh of the sample-and-hold capacitor Csh that indicates a differential processing result and in the signal waveform of V latch that indicates a reset level detection result.

When a light amount corresponding to the range of light amount C to light amount D is incident, since the reset level Vr becomes lower than Vr1 due to an occurrence of the black-sun phenomenon as shown in the timing chart of FIG. 5, the differential processing result ΔVcsh between the reset level Vr and the light signal level Vs which is at Vssat is lower than the saturation level Vsat. Since, however, the reset level Vr is equal to or above the reset level threshold value Vref and is detected as within the threshold by the comparator 310, the V latch that is the reset level detection result is to retain "L" level at time t5.

When a light amount corresponding to the range of light amount D to light amount E is incident as shown in the timing chart of FIG. 6, since the reset level Vr is additionally lowered from the case shown in the timing chart of FIG. 5 due to an occurrence of the black-sun phenomenon, the differential processing result ΔVcsh between the reset level Vr and the light signal level Vs which is at Vssat is lowered further from the case shown in the timing chart of FIG. 5. Further, since the reset level Vr is lower than the reset level threshold value Vref and is detected as outside the threshold by the comparator 310, the V latch that is the reset level detection result is to retain "H" level at time t5.

When a light amount corresponding to light amount E or above is incident, since the reset level Vr is lowered to Vssat due to an occurrence of the black-sun phenomenon as shown in the timing chart of FIG. 7, the differential processing result ΔVcsh between the reset level Vr and the light signal level Vs which is at Vssat attains "0". Further, since the reset level Vr is lower than the reset level threshold value Vref and is detected as outside the threshold by the comparator 310, the V latch that is the reset level detection result is to retain "H" level at time t5.

Figure 8A:
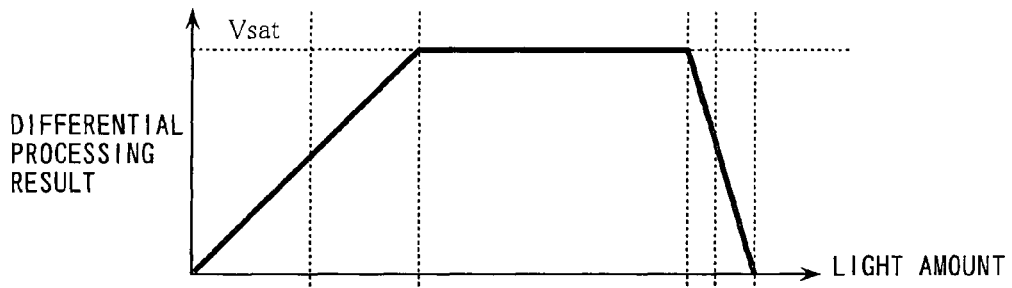
FIGS. 8A and 8B show a dependency on light amount of the differential processing result and the reset level detection result obtained in the embodiment shown in FIG. 3.
Figure 8B:
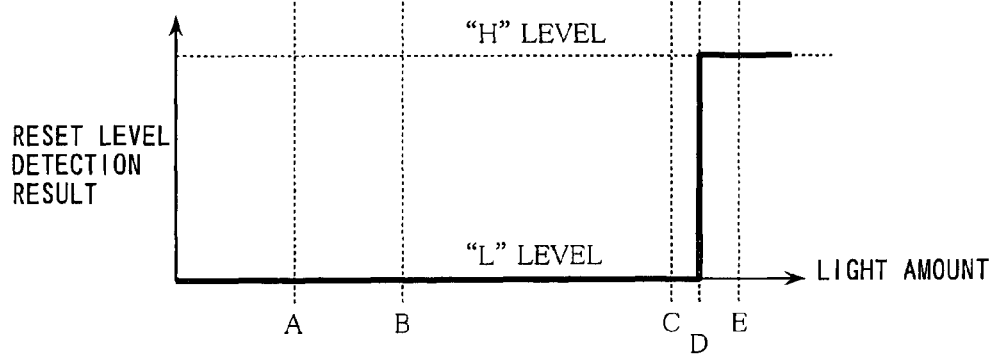

It is seen from the above description that the differential processing result and the reset level detection result obtained from the imaging apparatus of FIG. 3 exhibit dependencies on light amount as indicated in FIGS. 8A and 8B. Further, the differential processing result and the reset level detection result in the case of photographing the sun, when illustrated in image, result in the images of FIG. 9A and FIG. 9B, respectively.

Figure 9A:
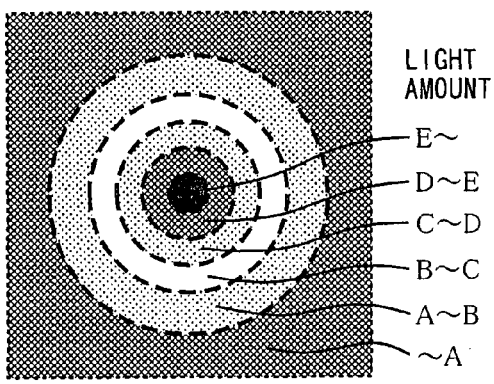
FIGS. 9A and 9B show in images a result of differential processing and a result of reset level detection when the sun is photographed with the imaging apparatus according to the embodiment shown in FIG. 3.
Figure 9B:
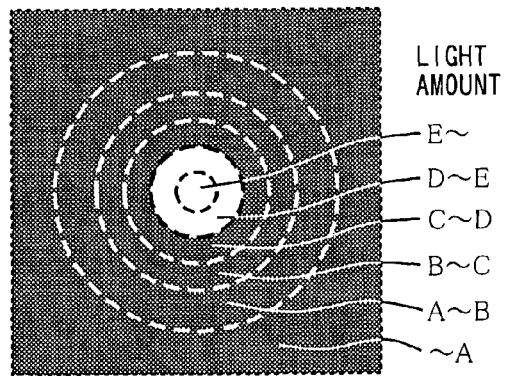
Figure 10:
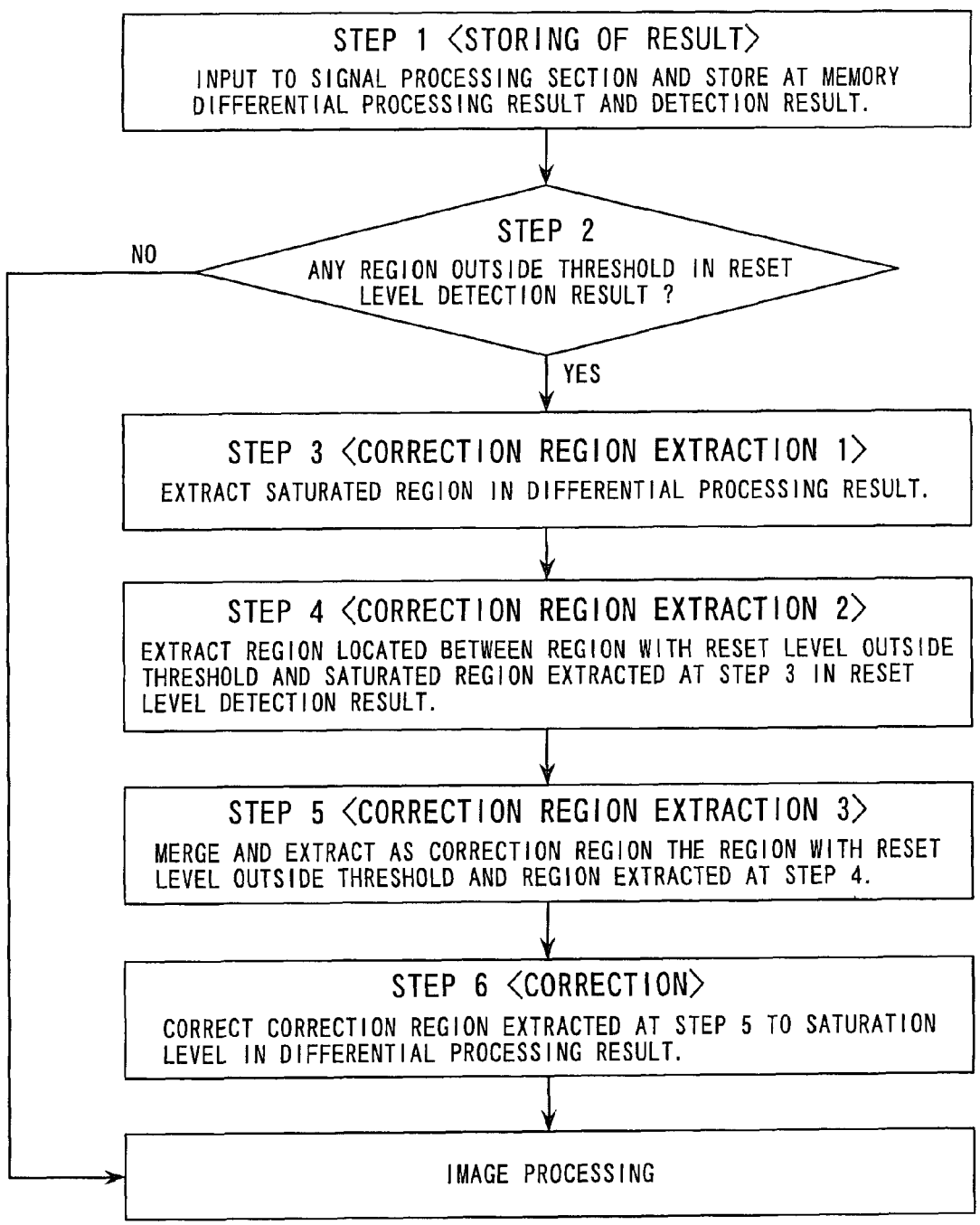
FIG. 10 is a flowchart for explaining an operation at the correction processing section in the embodiment shown in FIG. 3.

An operation at the interior of the correction processing section 500 will be described below by way of a flowchart shown in FIG. 10 based on the operation in the case where the differential processing result and the reset level detection result shown in FIGS. 9A and 9B are obtained.

Step 1: The differential processing result and the reset level detection result are stored at the memory 530. The images of the differential processing result and the reset level detection result stored at the memory 530 are similar to the images shown in FIG. 9A and FIG. 9B, respectively.

Step 2: It is decided at the decision section 540 whether or not a region outside the threshold occurs in the reset level detection result. If there is no region outside the threshold at this point, a correction processing is not performed and an image processing is effected on the differential processing result at a later-stage image processing section (not shown in FIG. 3). If there is a region outside the threshold, the processing proceeds to Step 3.

Step 3: Those saturated regions in the differential processing result stored at the memory 530 are extracted at the correction subject pixel extracting section 510. A region extracted at this time is indicated by the white-empty region in FIG. 11A. This region corresponds to region indicated by B to C in FIGS. 8A, 8B.

Step 4: Those regions (corresponding to region indicated by C to D in FIGS. 1A to 1C) located between those with reset level outside the threshold (corresponding to regions indicated by D to E, E or above in FIGS. 8A, 8B) and the saturated region extracted at Step 3 in the reset level detection result stored at the memory 530 are extracted at the correction subject pixel extracting section 510. A region extracted at this point is indicated by the white-empty region in FIG. 11B.

Step 5: The region with reset level outside the threshold and the region extracted at Step 4 are merged and extracted as correction region at the correction subject pixel extracting section 510. A region extracted at this point is indicated by the white-empty region in FIG. 11C.

Figure 11A:
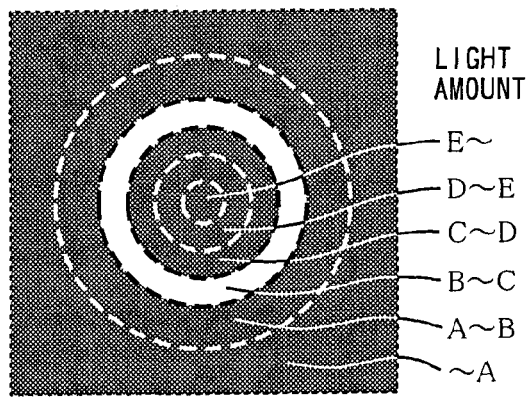
FIGS. 11A to 11D show images of region extracted by each step and after correction in the flowchart shown in FIG. 10.
Figure 11B:
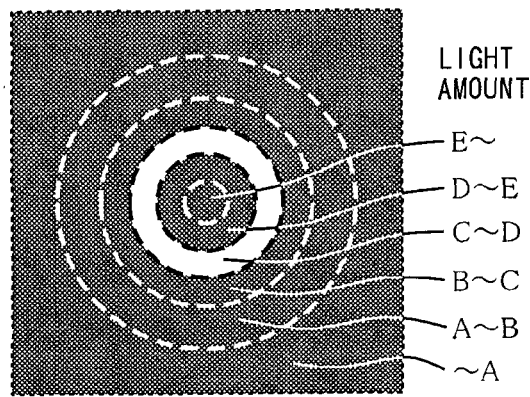
Figure 11C:
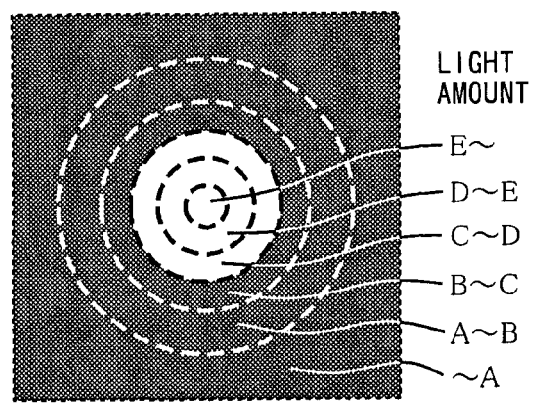
Figure 11D:
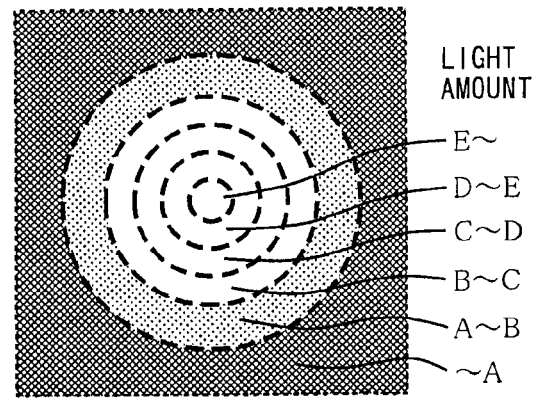

Step 6: A correction of the correction region extracted at Step 5 to saturation level is effected at the correction region 520 on the differential processing result stored at the memory 530. An image after correction at this point is shown in FIG. 11D.

Subsequently, the image after correction is subjected to image processing at the later-stage image processing section (not shown in FIG. 3).

With the imaging apparatus of the present embodiment as has been described, the differential processing result and the reset level detection result are outputted, and pixels to be corrected are subsequently extracted based on condition of how signal level changes in the differential processing result and on the reset level detection result. All of the pixels with an incident light amount of C or above can be thereby corrected as shown in FIG. 11C to a saturation level similar to the pixels with an incident light amount of B to C. Accordingly, the black-sun phenomenon can be suppressed without reducing the dynamic range unlike the case of prior-art where only a signal level corresponding to light amount A (level indicated by Vb in FIG. 1C) can be used as clip level.

It is to be noted that various modifications and alterations of each construction in the above embodiment are possible without departing from its objective. For example, of the circuit function and construction of each column, it is possible but not specifically limited to also have an amplification function and/or AD conversion function in addition to the differential processing function and the reset level detection function. Further, it is also possible to dispose the differential processing section and the reset level detecting section within an imaging device chip and to construct the preprocessing section and/or the correction processing section as external circuit so that the differential processing result and the reset level detection result are outputted from the imaging device chip to these external circuits.

Further, while the output paths in the present embodiment are provided as one for each of the differential processing result and the reset level detection result, the number of output path is not specifically limited to this. The construction of pixel is only required to have at least a photoelectric conversion function such as of photodiode, a charge/voltage conversion and amplification/read function such as of amplification transistor, and a reset control function such as of reset transistor, and the number of wirings and the number of device such as transistors are not specifically limited. While a case of constructing the pixel with n-channel MOS transistor has been described in the present embodiment, it is also possible to construct it with p-channel MOS transistor in which case a similar explanation as that with n-channel MOS transistor is possible by reversing the polarity of the voltages to be applied.

According to the invention as has been described by way of the above embodiment, since non-detected pixels occurring due to error in detecting the black-sun phenomenon can also be corrected, it is possible to achieve an imaging apparatus as capable of not reducing its dynamic range even when suppressing an occurrence of the black-sun phenomenon.

What is claimed is:

1. An imaging apparatus comprising:
    a plurality of pixels arranged into two dimensions;
    a differential processing means for effecting a differential processing between a reset level of said pixel and a signal level changing correspondingly to a light signal incident on said pixel so as to produce an imaging signal of the pixel;
    a reset level detection means for detecting and outputting a result as to whether said reset level is within a predetermined range or outside the predetermined range;
    an extraction means for extracting pixels to be corrected based on a result of the differential processing by said differential processing means and the result of detection by said reset level detection means; and
    a correction means for replacing the result of the differential processing by said differential processing means of the pixels to be corrected extracted by said extraction means with an imaging signal corresponding to a saturation level.

2. The imaging apparatus according to claim 1, wherein said extraction means extracts as the pixels to be corrected those pixels located between pixels of which the result of detection by said reset level detection means is outside the predetermined range and pixels of which the result of the differential processing by said differential processing means is at the saturation level.

* * * * *